June 17, 1930.　　G. W. HEINTZ　　1,764,627
ELECTRICALLY OPERATED CAR FOR RACING APPARATUS
Filed Nov. 25, 1927　　5 Sheets-Sheet 1
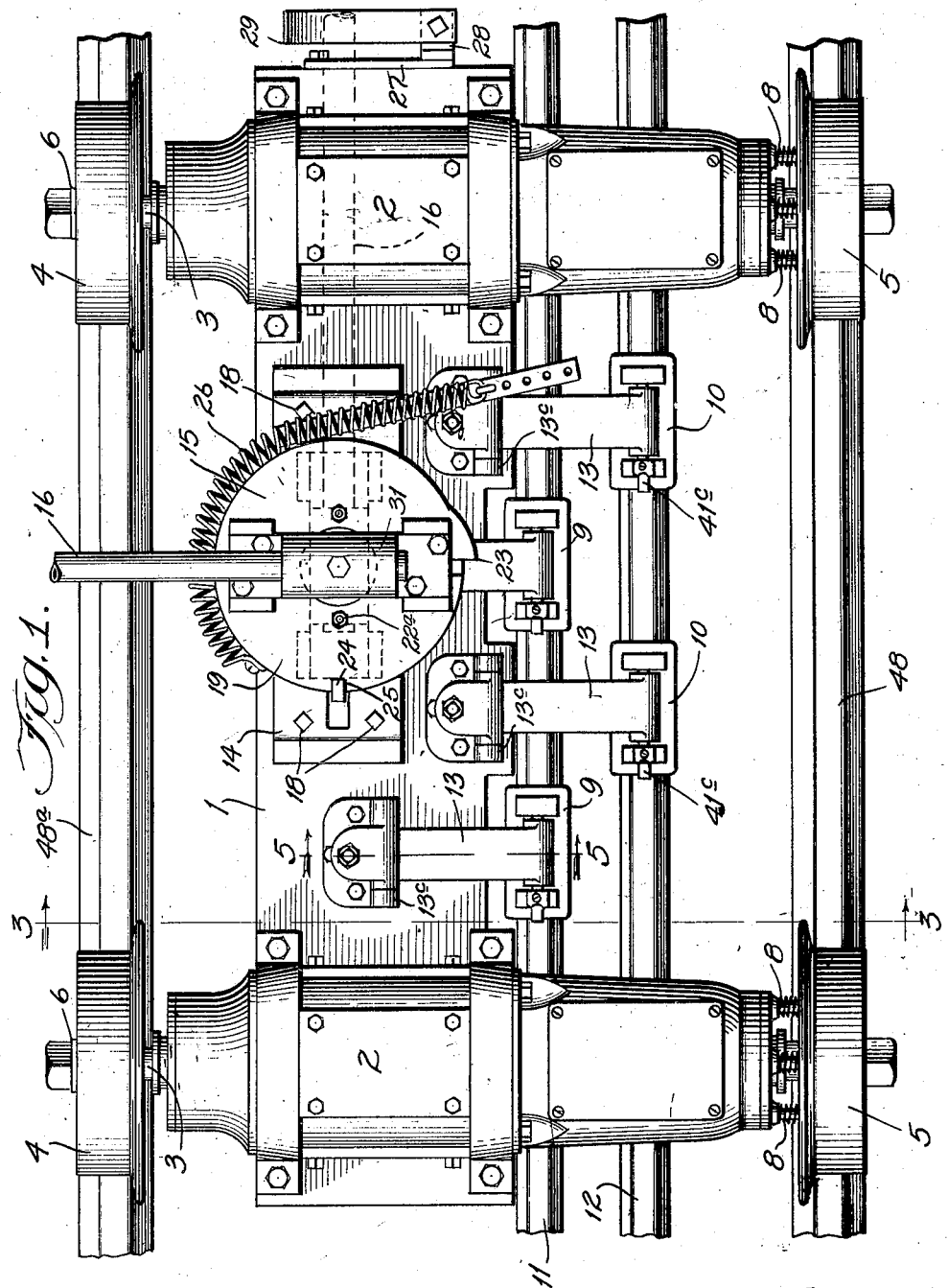

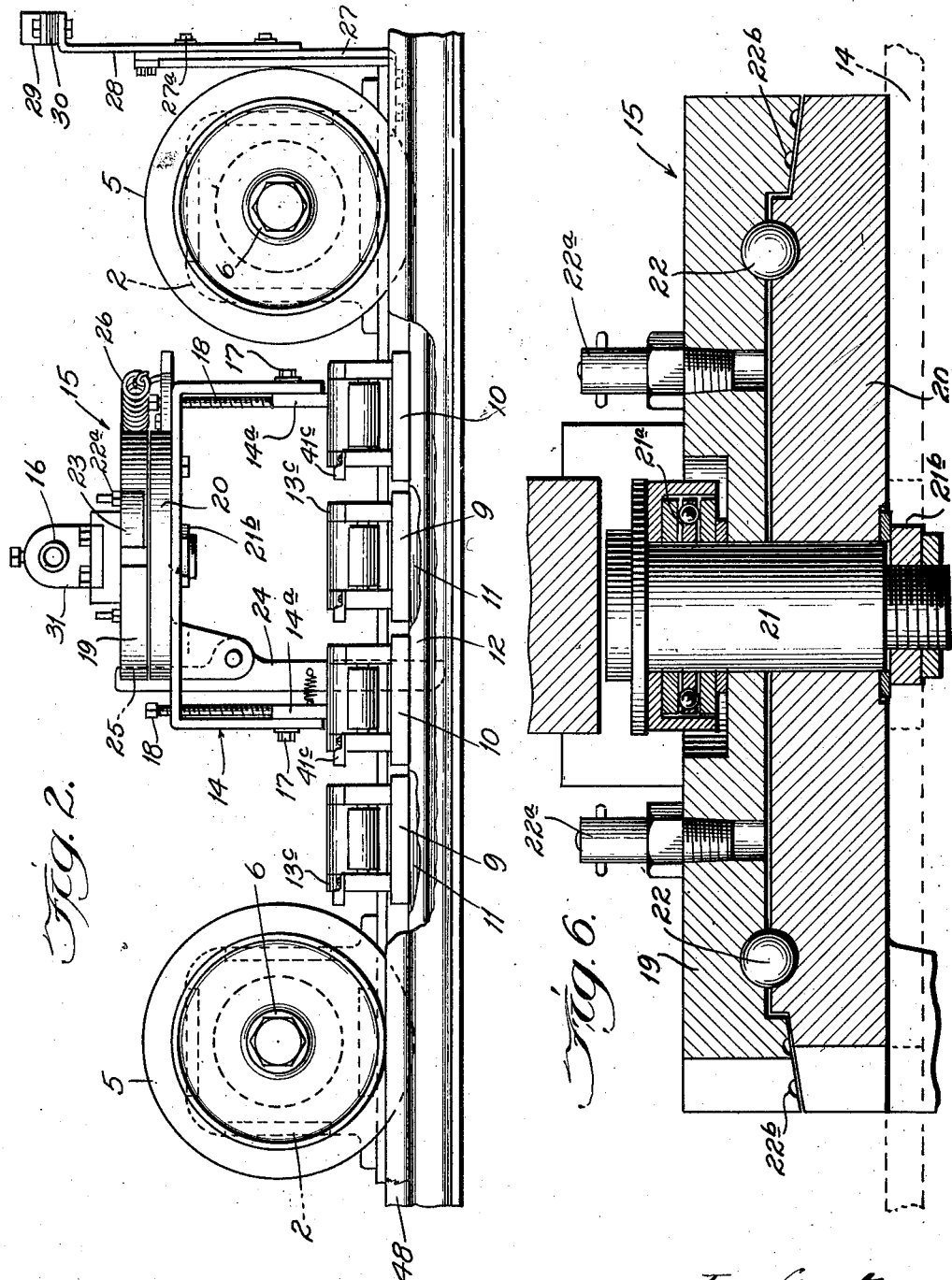

June 17, 1930. G. W. HEINTZ 1,764,627
ELECTRICALLY OPERATED CAR FOR RACING APPARATUS
Filed Nov. 25, 1927 5 Sheets-Sheet 3
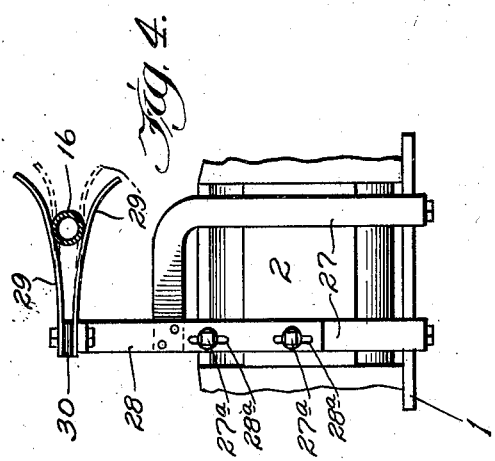
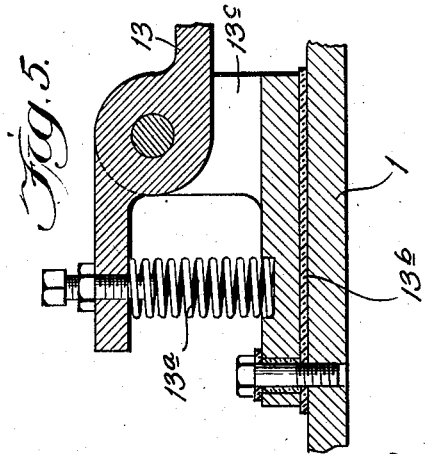
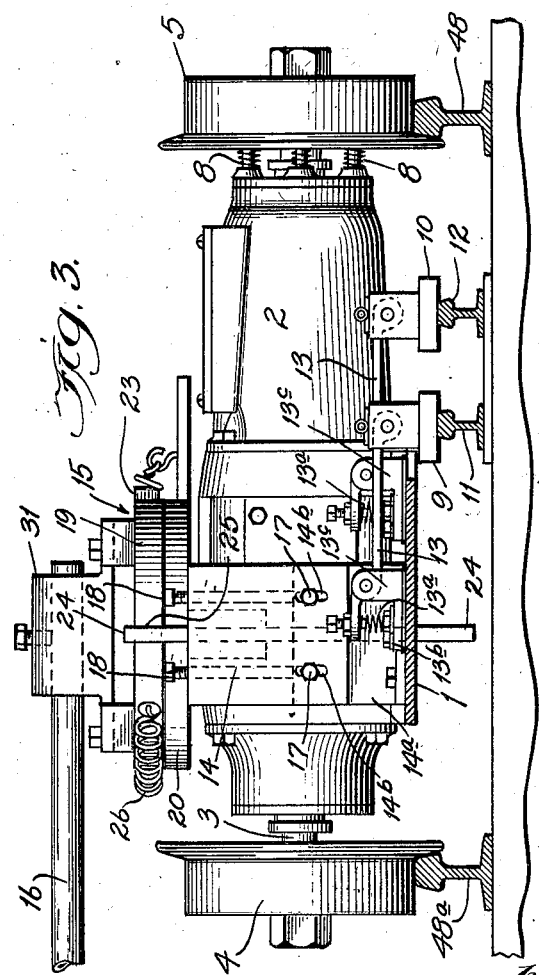
Inventor:
G. W. Heintz
by Bakewell & Church, attys.

June 17, 1930.  G. W. HEINTZ  1,764,627
ELECTRICALLY OPERATED CAR FOR RACING APPARATUS
Filed Nov. 25, 1927   5 Sheets-Sheet 4
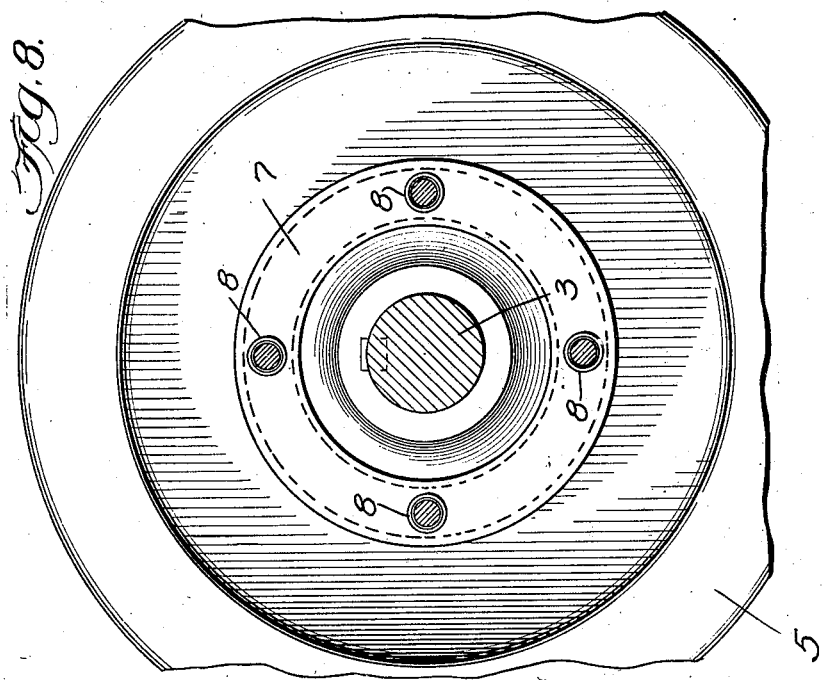
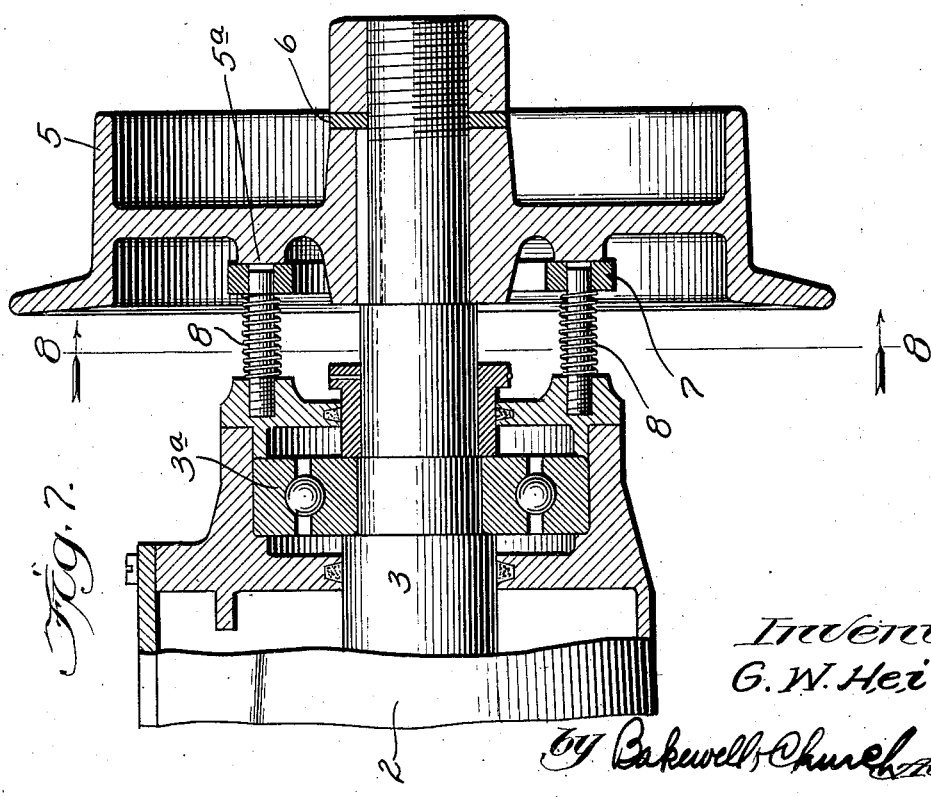
Inventor:
G. W. Heintz
by Bakewell Church

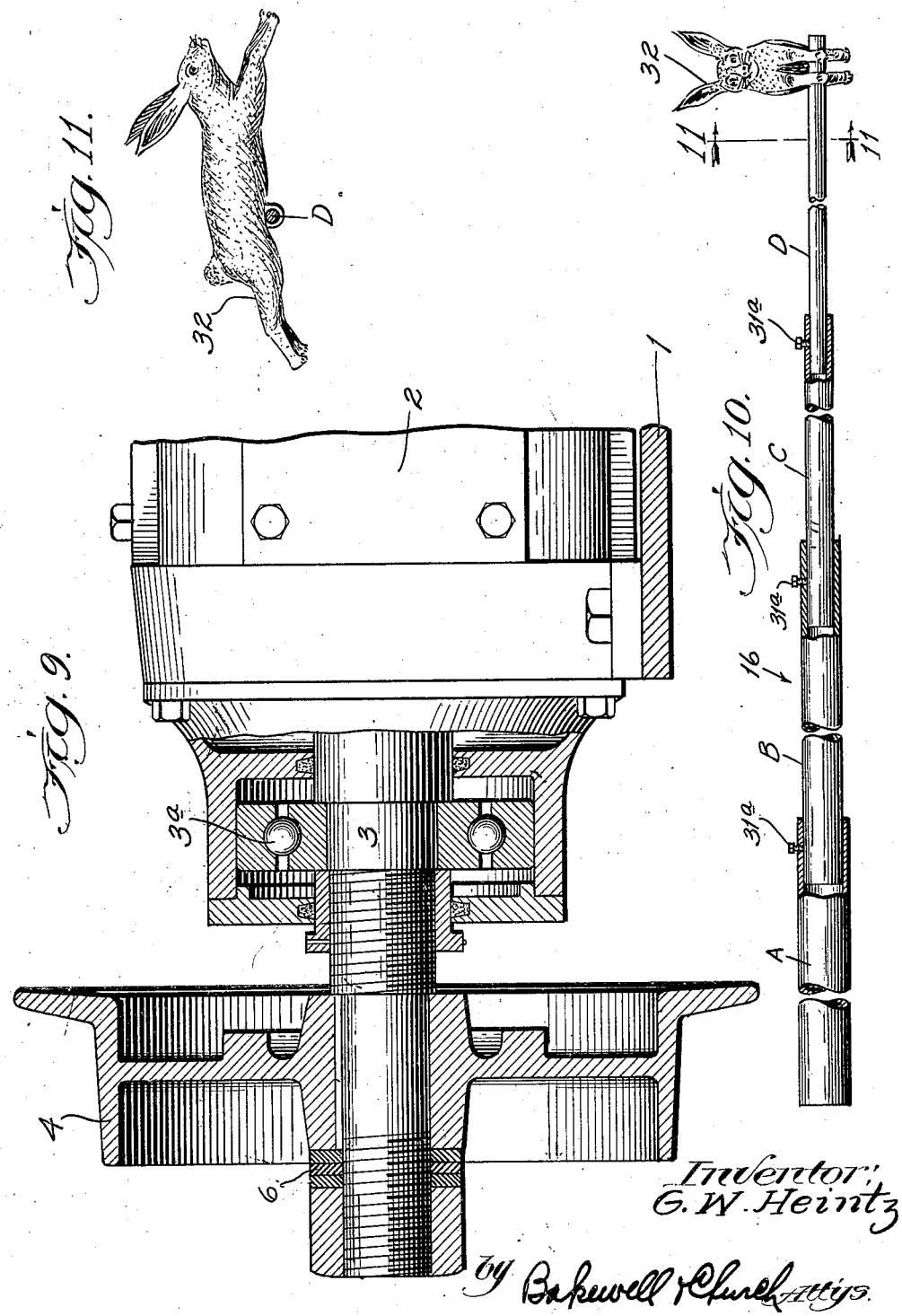

Patented June 17, 1930

1,764,627

UNITED STATES PATENT OFFICE

GEORGE W. HEINTZ, OF HAMILTON, OHIO

ELECTRICALLY-OPERATED CAR FOR RACING APPARATUS

Application filed November 25, 1927. Serial No. 235,590.

This invention relates to electrically-operated cars or trucks of the kind that are now used extensively in the sport or dog racing to carry a lure around a racing track at a point in advance of the dogs competing in the race, so as to create the impression of a fleeing animal, usually a rabbit, which the dogs try to catch.

One object of my invention is to provide a car that has a quick pick-up or which is capable of attaining an exceptionally high speed in a relatively short distance or short period of time, and which accordingly can be accurately controlled so as to keep the lure at a point in close proximity to the dogs but just ahead of the leading dog, thereby eliminating the possibility of one or more of the dogs overtaking the lure or running in front of the lure, which contingency would be apt to result in the dogs fighting or being struck by the part of the apparatus that sustains or carries the lure.

Another object is to provide an electrically-operated car or truck for dog racing apparatus that can be easily adjusted to adapt it to track rails of different gage.

Another object is to provide a car or truck of the kind referred to, that is equipped with a laterally-projecting lure carrying arm which can be adjusted vertically relatively to the track rails on which the car travels, so as to prevent said arm from rubbing against or contacting with the housing that conceals the car from view, in the event the horizontally-disposed slot in the housing through which the lure carrying arm projects is not absolutely parallel with the track rails or gets out of alignment with the track rails, due to sagging of the housing.

Another object is to provide a car or truck of the kind referred to, in which the lure carrying arm is constructed in such a way that it can be adjusted easily to vary the length of said arm, thereby enabling the car to be used on dog racing tracks of different widths, due to the fact that the lure carrying arm can be shortened or lengthened so as to arrange the lure in the proper or correct position on either a narrow track or a wide track.

And still another object of my invention is to provide a car or truck of the kind referred to that is equipped with a novel buffer against which the lure carrying arm strikes when said arm is tripped and moved into the housing to withdraw the lure from the track at the termination of the race. Other objects and desirable features of my invention will be hereinafter pointed out.

Figure 1 of the drawings is a top plan view of an electrically-operated car or truck for racing apparatus embodying my invention, illustrating the lure carrying arm projecting laterally from the car in the position said arm occupies during a race.

Figure 2 is a side elevational view of said car, showing one of the track rails broken away so as to more clearly illustrate the arrangement of the contact shoes that travel on the conductor rails.

Figure 3 is a transverse sectional view, taken on the line 3—3 of Figure 1, looking in the direction indicated by the arrows.

Figure 4 is an end elevational view of the buffer against which the lure carrying arm strikes when said arm swings inwardly into longitudinal alignment with the truck, so as to withdraw the lure from the racing track.

Figure 5 is a vertical sectional view, taken on the line 5—5 of Figure 1, looking in the direction indicated by the arrows, illustrating the means that is used to sustain the conductor shoes and insulate them from the bolster or frame of the car on which said shoes are mounted.

Figure 6 is an enlarged sectional view of the turntable to which the lure carrying arm is connected.

Figure 7 is an enlarged vertical sectional view, illustrating a portion of one of the motor housings, one of the wheels of the car and the bearing for the axle of said wheel.

Figure 8 is a sectional view, taken on the line 8—8 of Figure 7, looking in the direction indicated by the arrows.

Figure 9 is a view similar to Figure 7, illustrating the means that is used to adjust the wheels of the car, so as to adapt the car to track rails of different gage.

Figure 10 is a detail view, partly in section, of the lure carrying arm.

Figure 11 is a side elevational view of the lure, taken on the line 11—11 of Figure 10, looking in the direction indicated by the arrows; and Figure 12 is a wiring diagram of the car and the apparatus used to control the car.

In the accompanying drawings I have illustrated my invention embodied in an electrically-operated car or truck provided with four wheels that travel on track rails which extend around a track that is intended to be used in the sport of dog racing. The car is equipped with two electric motors, preferably of the A. C. 3-phase type, one of which is used to drive the front axle of the car and the other used to drive the rear axle of the car. The electric current used to operate said motors is supplied by one of the track rails on which the car travels and two conductor rails, the car being equipped with contact shoes that are held in sliding engagement with said conductor rails. The speed and direction of travel of the car are controlled by an operator, commonly referred to as a "tower man" stationed in a tower located at such a point with relation to the racing track that he can govern the speed of the car in such a way as to keep the lure in relatively close proximity to but just in advance of the leading dog competing in the race. In the car herein illustrated the lure, which usually consists of a stuffed rabbit or an imitation rabbit, is carried by an arm that projects laterally through a horizontally-disposed slot in the side wall of the housing over the track rails that conceals the car from view, said lure carrying arm being maintained in this position during the race by a locking mechanism mounted on the car. At the termination of the race, or after the car has passed the finish line of the racing track, a tripping device that is arranged in the path of travel of the car, trips or releases the locking mechanism on the car that retains the lure carrying arm in its operative position, and thus permits a spring or other suitable means to act on the lure carrying arm and move said arm in a direction to withdraw the lure from the racing track and position said lure inside of the housing in which the car travels.

In order that the car may be used on track rails of different gage, two of the wheels at one side of the car are mounted in such a way that they can be easily adjusted longitudinally of their axles. In view of the fact that the lure carrying arm, when in its operative position, projects laterally through a horizontally-disposed slot in one side wall of the housing in which the car travels. I have equipped the car with means for enabling the lure carrying arm to be adjusted so as to raise said arm or tilt it slightly with relation to the track rails on which the car travels, thereby enabling the lure carrying arm to be set in such a position that it will not rub against the top or bottom edge of the horizontal slot in the housing, even though the housing has sagged, as so often occurs after the housing has been in use for sometime. Adjustment of the lure carrying arm can be effected in various ways without departing from the spirit of my invention, but I prefer to mount the turntable which sustains the lure carrying arm on a supporting structure that can be raised or lowered and also tilted slightly so as to change the angle of the lure carrying arm. It is highly important in dog racing apparatus that the lure be arranged in a certain approximate position with relation to one edge of the track, and in order that my improved car or truck may be used on racing tracks of different widths, I construct the lure carrying arm in such a way that it can be easily adjusted to vary the length of said arm. Still another novel feature of my improved car or truck is a buffer that is used to arrest the movement of and absorb the shock on the lure carrying arm when said arm is tripped at the termination of the race and moved into the housing to withdraw the lure from the racing track.

In the accompanying drawings 1 designates the frame or bolster of my improved car, which is equipped with two electric motors whose housings 2 are arranged transversely of the car adjacent the opposite ends of the bolster 1, as shown clearly in Figure 1. The shafts 3 of said motors constitute axles which carry wheels 4 and 5 that travel on track rails 48$^a$ and 48, respectively, the wheels 4 which travel on the dead track rail 48$^a$ being keyed to their axles, as shown in Figure 9. In order that the car may be used on track rails of different gage, the wheels 4 are mounted on their axles in such a way that they can be adjusted longitudinally of same, the means herein illustrated for this purpose and illustrated in Figure 9 consisting of a plurality of shims or washers 6, all of which can be arranged at the outer end of the hub of the wheel, or one or more of which can be arranged at the inner end of the hub of the wheel, so as to space the two wheels of each axle farther apart. The axles of the car are preferably equipped with friction-reducing bearings, preferably ball bearings 3$^a$ of the annular type, and in order that the electric current may flow freely from the live track rail 48 to the motors without passing through the axle bearings 3$^a$ located adjacent the wheels 5, each of said wheels 5 is provided on its inner side with an annular boss 5$^a$ against which a collector ring 7 is forced by expansion springs 8, as shown in Figure 7. The car is equipped with a plurality of contact shoes 9 and 10, which are arranged in sliding engagement with conductor rails 11 and 12, respectively, that are located between the track rails 48 and 48a, as shown in Figure 3. Said contact shoes are electrically connected with the motors, and each of said shoes is sustained by an arm 13 pivotally mounted on the frame or bolster 1 of the car and combined with a spring 13a that exerts pressure on said arm 13 in a direction to hold the contact shoe thereon pressed firmly on the conductor rail with which it co-operates. The contact shoes are insulated from the frame or bolster of the car by means of insulating material 13b that is interposed between said bolster and the base plates of brackets 13c on which the arms 13 are pivotally mounted, as shown in Figure 5.

The arm that carries the lure is designated by the reference character 16, and said arm is sustained by a turntable 15 which is mounted on a supporting structure 14 that can be raised and lowered and also tilted slightly to change the angle of the lure carrying arm. Said supporting structure 14 is herein illustrated as being composed of a top member of substantially inverted U-shape whose side arms are adjustably connected to uprights 14a on the bolster 1 of the car by means of clamping screws 17 which pass through elongated slots 14b in the side arms of the member 14, as shown in Figures 2 and 3. When the clamping screws 17 are released the member 14 that carries the turntable 15 can be raised or lowered so as to adjust the lure carrying arm vertically with relation to the track rails on which the car travels, thereby enabling the lure carrying arm to be set in such a position that it will not rub against the top or bottom edge of the housing over the track rails through which the lure carrying arm projects laterally when the car is in use. In order that the member 14 may be tilted slightly so as to change the angle of the lure carrying arm, the elongated slots 14b in the member 14 through which the retaining screws 17 pass are made a trifle wider than the shanks of said screws, and a plurality of pairs of vertically-adjustable stop screws 18 are mounted in the cross piece of the inverted U-shaped member 14 in such a way that the lower ends of said stop screws will bear against the upper ends of the uprights 14a on the bolster 1 of the car, as shown in Figure 2. By releasing the retaining screws 17 and manipulating the stop screws 18, the cross piece of the member 14 can be set either in a level position, or in a slightly tilted or inclined position. This adjustability of the lure carrying arm adds greatly to the utility of my improved car, for it enables the lure to be arranged in such relation with the racing track as to produce a realistic impression of a rabbit running on said track. It will, of course, be understood that the cross piece of the member 14 is capable of only a relatively slight tilting movement, but such a slight movement is ample to attain the desired result, because of the relatively great length of the lure carrying arm. The turntable 15, which sustains the lure carrying arm, is herein illustrated as being composed of a stationary bottom part 20 rigidly connected to the cross piece of the member 14 and a revoluble or oscillating top part 19 that turns on a king pin 21. As shown in Figure 6, said king pin 21 is preferably provided with a thrust bearing 21a, so as to relieve the friction produced by tightening the nut 21b at the lower end of the king pin which holds it in position. In order that the top member 19 of the turntable will rotate or oscillate freely, balls 22 are arranged between the members 19 and 20 in annular raceways formed in the meeting faces of said members. Grease cups or Alemite fittings 22a are mounted in the top member 19 of the turntable, so as to enable a lubricant to be supplied to the ball bearings 22, and annular grooves 22b are preferably formed in the underside of the member 19 adjacent the periphery of same, so as to tend to prevent the lubricant from escaping from the joint or space between the members 19 and 20, the lubricant which collects in the grooves 22b on the underside of the member 19 virtually acting as a seal which effectively prevents dirt and other foreign matter from finding its way into the space between the members 19 and 20 and also prevents the lubricant between said members from being thrown outwardly by centrifugal force when the top member 19 of the turntable revolves or oscillates. When the car is in use during a race the lure carrying arm 16 projects laterally from the car, as shown in Figure 1, said arm being retained in this position by a pivotally mounted locking device 24 carried by the bolster 1 of the car and arranged so that its lower end is positioned between the track rails, as shown in Figure 3, and its upper end is positioned in a notch 25 formed in the peripheral edges of the top and bottom members 19 and 20 of the turntable, as shown in Figures 1 and 2. After the car has passed the finish line of the racing track, a tripping device that is arranged in the path of travel of the locking device 24 engages said device 24 and moves it in a direction to withdraw the upper end of same from the notch 25 in the turntable, thereby permitting a spring 26 that is attached to the top member 19 of the turntable to contract and move said top member 19 in a clockwise direction, whereupon the lure carrying arm 16 will swing into the housing and withdraw the lure from the racing track. As the lure carrying arm swings inwardly into the housing, a lug 23 on the top member 19 of the turntable comes into engagement with the locking device 24, thereby arresting the movement of the top member 19 of the turntable and causing the lure carrying arm to be maintained in a position longitudinally of the car. In order to prevent the mechanism, especially the lure carrying arm, from being subjected to an injurious strain when the lug 23 on the top member of the turntable strikes against the locking device 24, as above described, I have equipped the car with a buffer that is arranged at the right hand end of the car, looking at Figure 1, in such a position that it will gradually check the movement of the lure carrying arm 16, as said arm approaches its inoperative position, i. e., a position in which it extends longitudinally of the car. Said buffer is illustrated in detail in Figure 4 and is preferably composed of a stationary frame member 27 connected to the bolster of the car, and a vertically adjustable upright 28 on said frame member provided with a pair of resilient elements 29 arranged so as to form a bifurcated resilient stop into which the lure carrying arm 16 moves as said arm approaches its inoperative position. The resilient members 29 are similar in character to the contacts of a conventional knife switch, and as they are capable of yielding or separating slightly when engaged by the lure carrying arm, they effectively check the movement of said arm and cause it to come to rest without liability of injuring the arm or the co-operating elements that arrest the movement of the turntable. The upright 28 that carries the resilient members of the buffer with which the lure carrying arm contacts can be raised and lowered so as to provide for the vertical adjustment of the lure carrying arm, and said upright is herein illustrated as being retained in adjusted position by means of screws 27$^a$ carried by the frame member 27 and arranged in elongated slots 28$^a$ in the upright 28. In order that the resistance offered by the resilient elements 29 to the inward movement of the lure carrying arm 16 may be varied, I arrange shims 30 between the resilient elements 29, as shown in Figure 4.

As previously stated, the lure carrying arm 16 is constructed so that said arm can be shortened or lengthened so as to arrange the lure at the required distance or desired distance from the edge of the racing track. In the form of my invention herein illustrated the lure carrying arm 16 is mounted in a bearing 31 connected in any suitable way to the top member 19 of the turntable, and said arm is composed of a plurality of telescoped tubular sections A, B, C and D, as shown in Figure 10. Said telescoped sections are retained in adjusted position by means of set screws 31$^a$, and if desired, the portions of the lure carrying arm on which the inner ends of the set screws 31$^a$ act can be provided with holes so as to receive the inner ends of said set screws, and thus eliminate the possibility of the various sections of the lure carrying arm moving accidentally relatively to each other. The lure 32, which is mounted on the outer end of the lure carrying arm, is herein illustrated as consisting of an imitation rabbit, but as previously stated, it is immaterial what the lure consists of.

In Figure 12 of the drawings the reference characters 40, 41 and 42 designate the leads of the two motors that are used to propel the car. The lead 40 is grounded to the frame or bolster of the car in any suitable way, as, for example, by a ground wire 43, and the lead 41 is connected by a conductor 41$^a$ with one of the contact shoes 10, which shoe 10 is connected with its co-operating shoe by a conductor 41$^b$ attached to terminals 41$^c$ with which said shoes are equipped. The lead 42 is connected by a suitable conductor 42$^a$ to the two contact shoes 9 which are electrically connected together in the same manner as the contact shoes 10. The conductor rail 11 is connected by a lead 45 to the controller 50 located in the tower from which the speed and direction of travel of the car is governed, and the conductor rail 12 is connected by a lead 47 to said controller. The live track rail 48 is connected by a lead 49 with the controller 50. As shown in Figure 12, the controller 50 is connected with the supply lines 51 by means of a switch 52.

Having thus described my invention, what I claim as new and desire to secure by Letters Patent is:

1. A car or truck for racing apparatus, comprising a frame provided with wheels, uprights on said frame, a substantially inverted, U-shaped sustaining member whose legs bear against said uprights, means for clamping said legs to said uprights, adjustable devices that are adapted to be set in different positions so as to determine the level of the cross piece of said sustaining member relatively to said uprights, and a lure carrying arm supported by said sustaining member.

2. A car or truck for racing apparatus, comprising a frame provided with wheels, a turntable on said frame, a lure carrying arm on said frame that is adapted to project laterally from the car when the car is in use in a race, a spring combined with said turntable for retracting said arm, a locking device that co-operates with said table to hold the arm in its extended or operative position, said locking device being adapted to be tripped to release the arm, a lug on said turntable that comes in contact with said locking device when the arm moves into its retracted position, and a bifurcated resilient buffer on the frame of the car arranged so as to receive said arm when said arm approaches its retracted position.

3. A car or truck for racing apparatus, comprising a frame provided with wheels, a lure carrying arm on said frame that projects laterally from the frame when the car is in use in a race, a means for retracting said arm, a buffer for checking the movement of said arm when it approaches its retracted position, means for enabling said arm to be adjusted vertically, and means for enabling said buffer to be adjusted vertically.

4. A car or truck for racing apparatus, comprising a frame provided with wheels, a lure carrying arm on said frame that projects laterally from the frame when the car is in use in a race, a means for retracting said arm, a buffer for checking the movement of said arm when it approaches its retracted position comprising opposed resilient members between which the arm moves, and means for enabling said resilient members to be adjusted relatively to each other to vary the frictional pressure which they exert on said arm.

5. A car or truck for racing apparatus, comprising a frame provided with wheels, electric motors on said frame whose shafts constitute axles for said wheels, a turntable on said frame, a lure carrying arm supported by said turntable, means for vertically adjusting said turntable, means for varying the length of said arm, a spring combined with said turntable for exerting pressure thereon in a direction to hold the lure carrying arm in a retracted position, a locking device that co-operates with said turntable to hold the lure carrying arm in an extended position wherein it projects laterally from the car, said locking device being adapted to be tripped when the car is in motion, a buffer that co-operates with said arm to check the movement of same when it approaches its retracted position, and means for enabling said buffer to be adjusted vertically.

6. A car or truck for racing apparatus, comprising a frame provided with wheels, electric motors on said frame whose shafts constitute axles for said wheels, a turntable on said frame, a lure carrying arm supported by said turntable, means for vertically adjusting said turntable, means for varying the length of said arm, a spring combined with said turntable for exerting pressure thereon in a direction to hold the lure carrying arm in a retracted position, a locking device that co-operates with said turntable to hold the lure carrying arm in an extended position wherein it projects laterally from the car, said locking device being adapted to be tripped when the car is in motion, a buffer that co-operates with said arm to check the movement of same when it approaches its retracted position, means for enabling said buffer to be adjusted vertically, spring-pressed contact shoes on the frame of the car that are adapted to slide on conductor rails, and friction-reducing bearings for said turntable.

GEORGE W. HEINTZ.